United States Patent
Cyr

(10) Patent No.: US 10,416,952 B2
(45) Date of Patent: Sep. 17, 2019

(54) IDENTIFYING A VIEWPORT WITHIN A BROWSER WINDOW

(71) Applicant: salesforce.com, inc., San Francisco, CA (US)

(72) Inventor: Peter Cyr, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/634,882

(22) Filed: Jun. 27, 2017

(65) Prior Publication Data

US 2018/0373485 A1   Dec. 27, 2018

(51) Int. Cl.
| | |
|---|---|
| G06F 3/14 | (2006.01) |
| G06T 7/70 | (2017.01) |
| G06T 7/60 | (2017.01) |
| G06T 3/40 | (2006.01) |
| G06F 3/0484 | (2013.01) |

(52) U.S. Cl.
CPC ........ *G06F 3/1462* (2013.01); *G06F 3/04845* (2013.01); *G06T 3/40* (2013.01); *G06F 2203/04806* (2013.01); *G06T 7/60* (2013.01); *G06T 7/70* (2017.01)

(58) Field of Classification Search
CPC .... G06F 17/241; G06F 3/1423; G06F 3/1462; G06Q 10/10; G06T 3/20; G06T 3/40; G06T 7/60; G06T 7/70
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Chante E Harrison
(74) *Attorney, Agent, or Firm* — Weaver Austin Villeneuve & Sampson LLP

(57) ABSTRACT

Disclosed are some implementations of systems, apparatus, methods and computer program products for facilitating the identification of a viewport within a browser window of a screen that is shared via a screen-sharing application. By accurately identifying the location and dimensions of the viewport within the browser window, it is possible to render the viewport in the correct location within a screen of a remotely located device.

20 Claims, 15 Drawing Sheets
(10 of 15 Drawing Sheet(s) Filed in Color)

(56) References Cited

U.S. PATENT DOCUMENTS

| | | | |
|---|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,051,040 B2 * | 5/2006 | Easwar ............... G06F 17/3028 |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0122898 A1 * | 6/2004 | Srinivasa ............... G06F 17/241 |
| | | 709/205 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0218958 A1 | 9/2011 | Warshaysky et al. |
| 2011/0247051 A1 | 10/2011 | Bulumulla et al. |
| 2011/0289401 A1* | 11/2011 | Fischer ................ G06F 17/241 |
| | | 715/232 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0012843 A1* | 1/2015 | Ouyang ................ H04L 65/403 |
| | | 715/753 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0170617 A1* | 6/2016 | Shi ........................ G06F 3/0484 |
| | | 345/668 |
| 2016/0232647 A1* | 8/2016 | Carlos ................... G06F 3/1423 |
| 2016/0328114 A1* | 11/2016 | Santhakumar ...... G06F 3/04817 |
| 2018/0052587 A1* | 2/2018 | LaPier ................ G06F 3/04817 |

\* cited by examiner

IDENTIFYING A VIEWPORT WITHIN A BROWSER WINDOW

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

BACKGROUND

A number of screen sharing services offer a variety of applications for both personal and professional use. Through the use of such screen sharing services, users may easily collaborate by sharing the screen of their device with other participants. These applications have a number of useful applications including remote support and meetings.

BRIEF DESCRIPTION OF THE DRAWINGS

The patent or application file contains at least one drawing executed in color. Copies of this patent or patent application publication with color drawings will be provided by the Office upon request and payment of the necessary fee.

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

DETAILED DESCRIPTION

Figure 1:
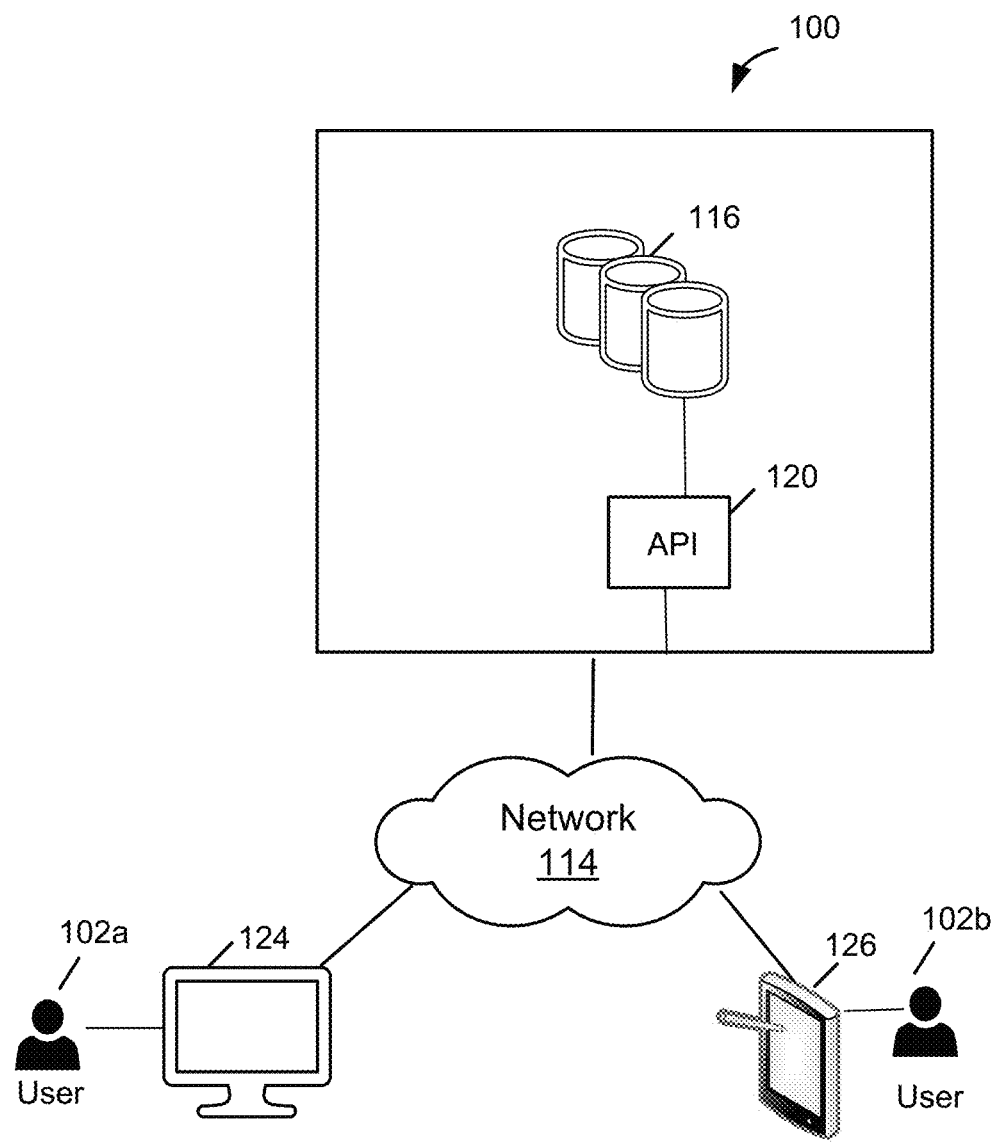
FIG. 1 shows a system diagram of an example of system 100 in which a screen sharing application may be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for identifying a viewport within a browser window of a screen that is shared via a screen sharing application. By accurately identifying the location and dimensions of the viewport within the browser window, it is possible to render the viewport in the correct location within a screen of a remotely located device.

A number of screen sharing services enable an end user's screen to be shared with a remote user during a video call. For example, an end user may share their screen with a company employee such as a customer service agent or technical support employee. To assist the end user, the employee may provide a visual response by drawing over the original screen. Therefore, it is important that the screen that the user views is spatially synchronized with that presented to the employee, and vice versa.

By way of illustration, John is a customer service agent within a customer call center of an organization, Pyramid Insurance, Inc. John is responsible for responding to customer inquiries. John receives a video call from a particular customer, Jane. Both John and Jane are using computing devices on which a screen sharing application is installed. Jane's question pertains to a web page that she is viewing within a browser window via her computing device. John determines that the answer to Jane's inquiry lies within a specific portion of the web page. To answer Jane's inquiry in the most efficient manner, John circles the portion of the web page of the screen that is relevant to his answer.

Often, an end user's inquiry will pertain to a web page that they are viewing within a browser window. Typically, screen sharing applications enable a screen including the viewport to be shared and therefore visible to a user of a remotely located computing device. Generally, the viewport consumes only a portion of the screen. If the viewport is not rendered in the same location within the screen at both the customer and agent devices, communications pertaining to the shared screen may be misinterpreted.

In accordance with various implementations, screens that are shared between remotely located devices may be synchronized by identifying a viewport within a browser window. Once the viewport has been identified within the browser window of an end user's computing device, the information that identifies the specific location and dimensions of the viewport may be transmitted to facilitate the accurate representation of the viewport at a remotely located computing device.

FIG. 1 shows a system diagram of an example of system 100 in which a screen sharing application may be implemented, in accordance with some implementations. System 100 includes a variety of different hardware and/or software components that are in communication with each other. Communication among components of system 100 may be facilitated through a combination of networks and interfaces. System 100 may handle and process data requests from users 102 of system 100. In the non-limiting example of FIG. 1, system 100 includes at least one content service database 116 and at least one application programming interface (API) 120 that facilitates access to the content service database 116. In accordance with various implementations, users may access system 100 to learn about a corresponding web site and its associated services, access data maintained by the content service database 116, or access various services offered by system 100. Content service database 116 may be configured for a variety of businesses. For example, data associated with an insurance company may include customer data, account data, and insurance plan data.

Users 102 can access system 100 via a network 114. Users 102 can include different users corresponding to a variety of roles and/or permissions. Examples of users include business users, technical users, content generator users, and learning users. In this example, user 102a of first computing device 124 is a technical support or customer service agent, while user 102b of second computing device 126 is a customer requesting technical support or assistance from user 102a. Examples of devices used by users include, but are not limited to a personal computer (e.g., desktop computer) or portable electronic device (i.e., mobile device) such as a smartphone, a tablet, a laptop, a wearable device such as Google Glass®, another optical head-mounted display (OHMD) device, a smart watch, etc.

Computer-readable instructions for performing the disclosed methods may be downloaded from a web site such as an application store. The computer-readable instructions may be stored in memory of a computing device such as the first computing device 124 and/or the second computing device 126. In addition, the computer-readable instructions may be stored in a memory that is external to the first computing device 124 and/or the second computing device 126. In some implementations, the computer-readable instructions are implemented in the form of a browser extension.

In the following description, examples refer to a customer computing device and an agent computing device. However, it is important to note that these examples are merely illustrative and the disclosed implementations may be applied by any devices communicating via a screen-sharing service.

Figure 2:
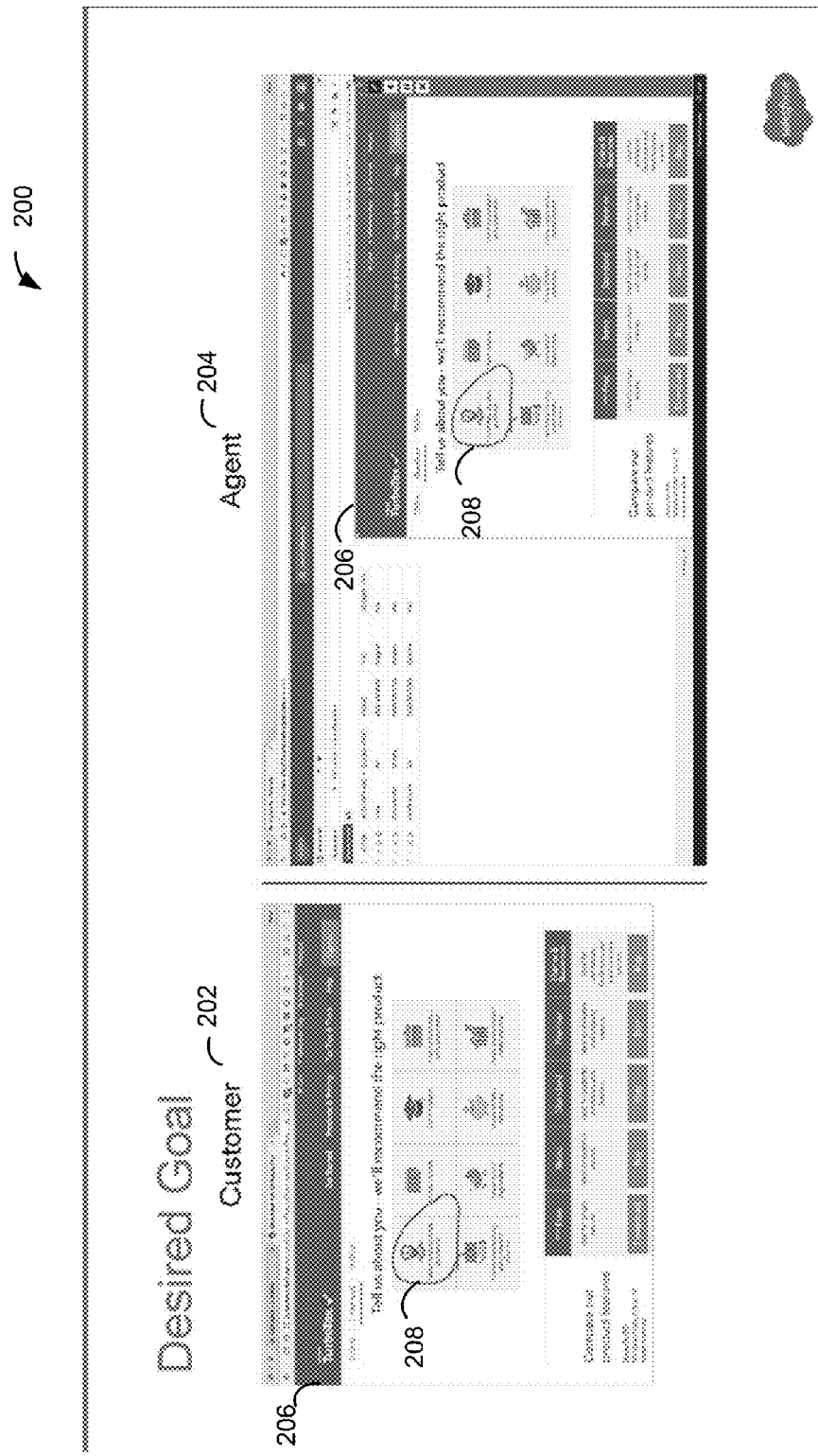
FIG. 2 shows an example of a desired goal 200 in the form of a first graphical user interface (GUI) 202 as displayed on a customer computing device and a second GUI 204 as displayed on an agent computing device, in accordance with various implementations.

FIG. 2 shows an example of a desired goal 200 in the form of a first graphical user interface (GUI) 202 as displayed on a customer computing device and a second GUI 204 as displayed on an agent computing device, in accordance with various implementations. When a customer initiates a video call via customer computing device 202, the video call is received by an agent via agent computing device 204. Content rendered within a viewport 206 of a browser window of first GUI 202 displayed on the customer computing device is shared with agent computing device via a screen sharing application, resulting in the content rendered within viewport 206 of the customer computing device 202 being rendered within second GUI 204.

During the video call, the agent views the content of the viewport 206 rendered within second GUI 204 displayed on the agent computing device and circles segment 208 within second GUI 204. The drawing performed by the agent to circle segment 208 is shared with the customer computing device via the screen sharing application. The desired goal is for the circled segment 208 to be visible and in the correct location within first GUI 202 displayed on the customer computing device. Unfortunately, the drawing of the agent may not be rendered within the correct location within first GUI 202 of the customer computing device, as will be described in further detail below.

Figure 3:
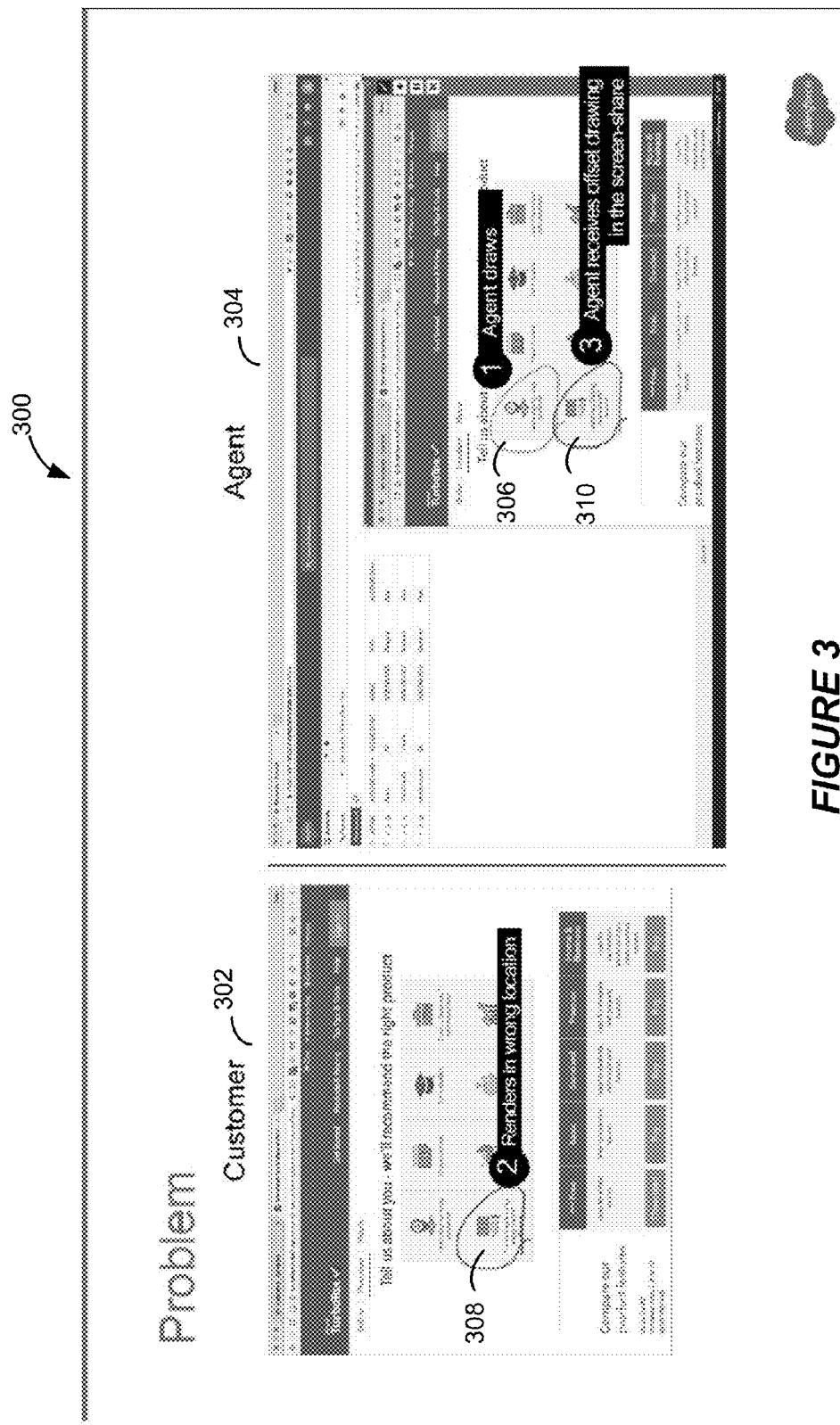
FIG. 3 shows an example of an offset 300 from the intended position of an agent drawing when displayed within the customer's browser window, in accordance with some implementations.

FIG. 3 shows an example of an offset 300 from the intended position of an agent drawing when displayed within a customer's browser window. The screen 302 of the customer's computing device is shared with the agent's computing device via the screen sharing application executing on the customer's computing device. The shared screen 302 is rendered via the agent's computing device, as shown at 304. At the agent's computing device, the agent draws over the shared screen rendered via the agent's computing device, as shown at 306. The drawing performed by the agent is sent to the customer's computing device via the screen sharing application in the form of coordinates. The screen sharing application executing on the customer's computing device can only draw within the viewport. Since the screen sharing application executing on the agent computing device cannot identify the viewport within the screen-share, the coordinates transmitted to the customer's computing device are in relation to the entire browser window rather than the viewport. As a result, it is impossible to accurately align the drawing of the agent at the customer's computing device. As shown at 308, the agent's drawing is rendered in the wrong location at the customer's computing device and the customer is pointed to the wrong location on the web page. The agent then receives the offset drawing in the subsequent screen-share, as shown at 310.

Figure 4:
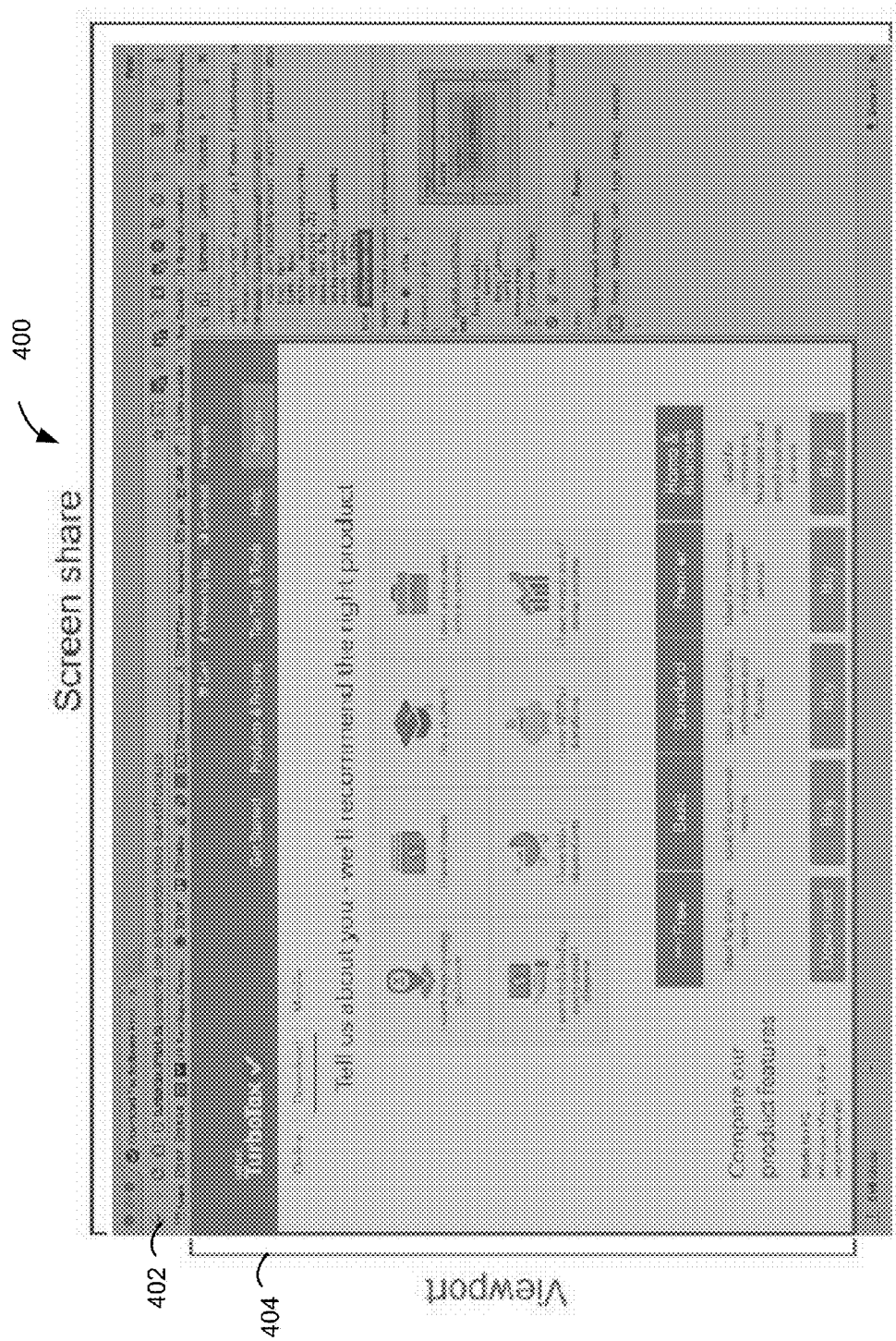
FIG. 4 shows an example of a GUI 400 illustrating a viewport within a screen that is shared via a screen sharing application, in accordance with some implementations.

FIG. 4 shows an example of a GUI 400 illustrating a viewport within a screen that is shared via a screen sharing application, in accordance with some implementations. As shown in this example, the screen share that is transmitted via a screen sharing application includes the entire browser window 402. The browser window 402 can include an address bar, bookmarks, a downloads bar, and/or a developer console. Viewport 404 is visible within a segment of the browser window 402.

The agent can draw over everything that is visible within their display. As a result, when the entire browser window is shared, the agent can draw outside the viewport. The coordinates of the drawing may be determined relative to the upper left corner of the screen-share.

In contrast, the customer who initiated the video call can only draw within the area of the viewport. The coordinates of the customer drawing may be determined relative to the upper left corner of the viewport. If the difference between the coordinates of the viewport and the coordinates of the screen-share cannot be accurately determined, the drawing of the customer will be offset by the difference. Unfortunately, browsers typically do not provide the information to determine this difference.

A number of attempts have been made to use the information provided by browsers to ascertain the difference between the coordinates of the viewport and the coordinates of the screen-share. However, it has been difficult to accurately ascertain the absolute position of the viewport relative to the screen-share.

Figure 5:
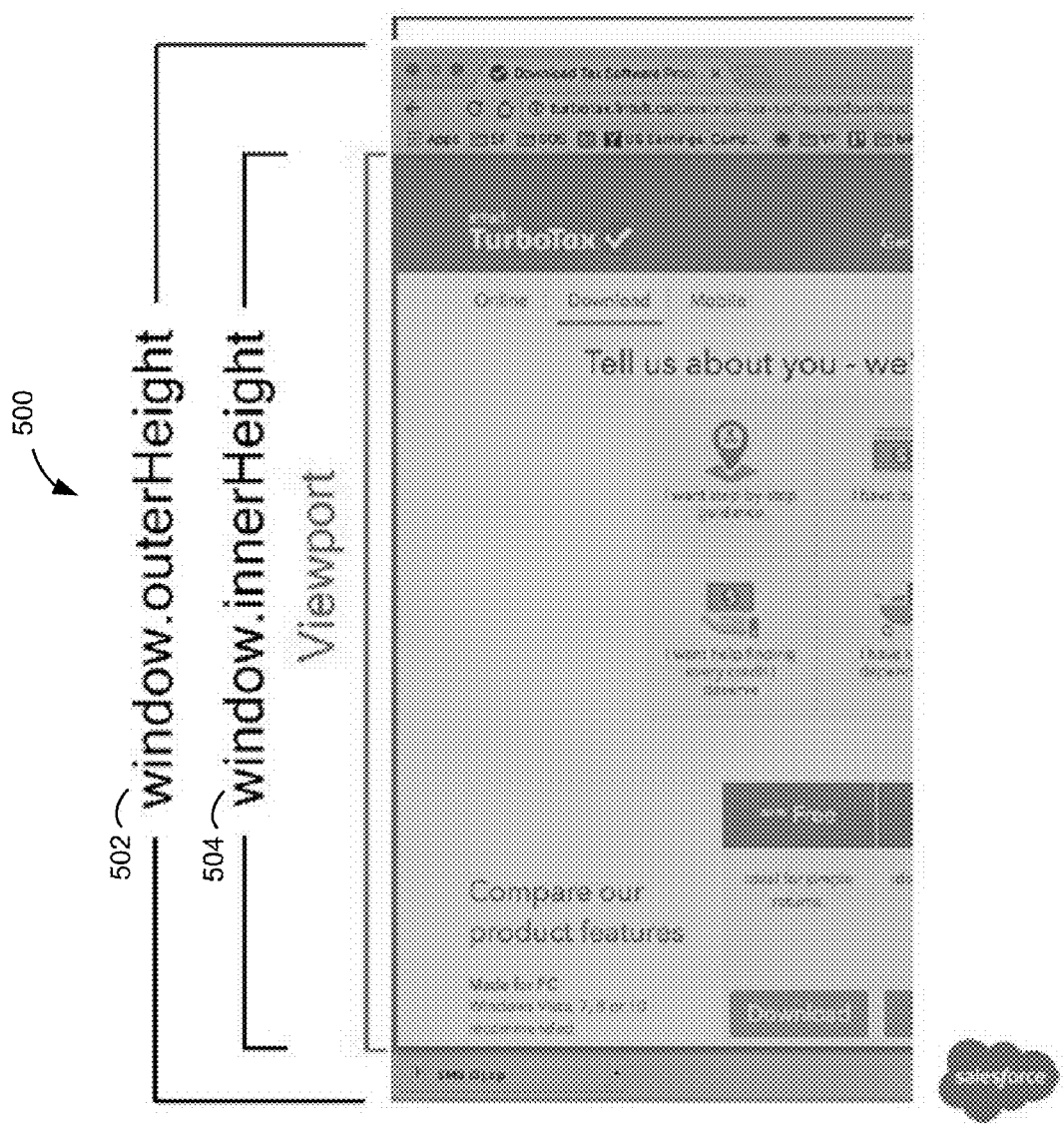
FIG. 5 shows an example of a GUI 500 illustrating one attempt to determine the absolute position of the viewport relative to the screen-share.

FIG. 5 shows an example of a GUI 500 illustrating one attempt to determine the absolute position of the viewport relative to the screen-share. Attempts have been made to use browser dimensions window.outerHeight 502 and window.innerHeight 504 to calculate the absolute position of the viewport relative to the screen-share. While the space outside the viewport may be ascertained, this has been proven to be unreliable because we cannot differentiate how much of this space is above or below the viewport. Therefore, the difference between the outer height and inner height of the browser window does not represent the absolute position of the viewport relative to the screen-share.

Other efforts to determine the absolute position of the viewport relative to the screen-share have similarly failed. For example, Tab Capture and Window Capture can be used with some browsers. However, Tab Capture and Window Capture are unsupported by browsers such as Firefox. As another example, DOM mirroring has limitations with rich content such as Flash, Java, video, animations, popup tabs, and complex interactions such as Google Maps.

In accordance with various implementations, a Tab Capture is mimicked by displaying only the customer's viewport to the agent. To mimic Tab Capture, the viewport is located within the browser window to enable the screen-share to be cropped to the dimensions of the viewport. By hiding or excluding portions of the browser window that are outside the viewport, the drawing performed at the agent device will automatically line up with the viewport at the customer device. To help locate the viewport, a marker is temporarily displayed within the browser window, as will be described in further detail below.

Figure 6A:
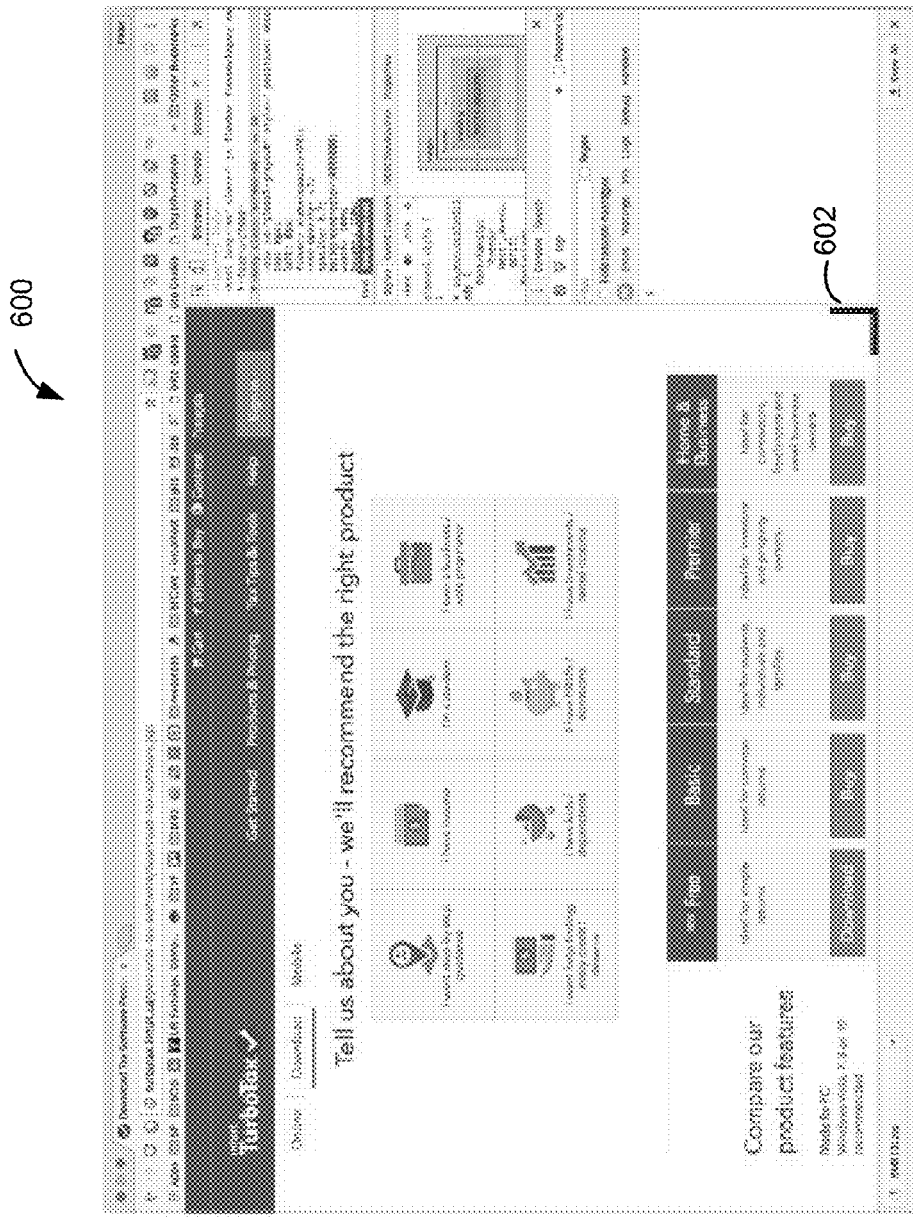
FIG. 6A shows an example of a GUI 600 in which a marker is displayed for identifying the viewport within the browser window, in accordance with some implementations.

FIG. 6A shows an example of a GUI 600 in which a marker is displayed for identifying the viewport within the browser window, in accordance with some implementations. Marker 602 may be rendered at a particular location within the browser window. As shown in this example, marker 602 may include a first portion that is rendered along a horizontal axis and a second portion that is rendered along a vertical axis. Marker 602 may be rendered for at least a minimum threshold time period to enable the viewport to be detected. For example, marker 602 may be rendered for a second or a fraction of a second. To allow the viewport to be detected, marker 602 should remain unobstructed until the viewport is detected.

Figure 6B:
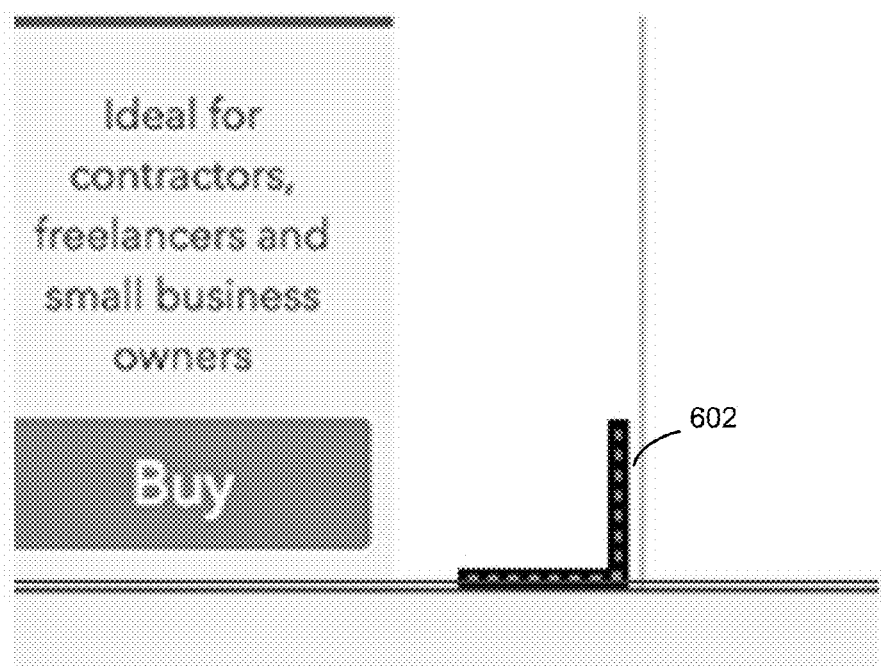
FIG. 6B shows an example of a marker 602 that may be rendered to locate the viewport, in accordance with some implementations.

FIG. 6B shows an example of a marker 602 that may be rendered to locate the viewport, in accordance with some implementations. In this example, marker 602 is L-shaped, enabling marker 602 to simultaneously detect a horizontal, lower bound of the viewport and a vertical, right bound of the viewport. Marker 602 may include a pattern that would not typically be rendered within a web page. Marker 602 may include a first color and a pattern includes dashes a second color. For example, the primary color of marker 602 shown in FIG. 6B is black, while the pattern of marker 602 includes dashes in green.

Figure 6C:
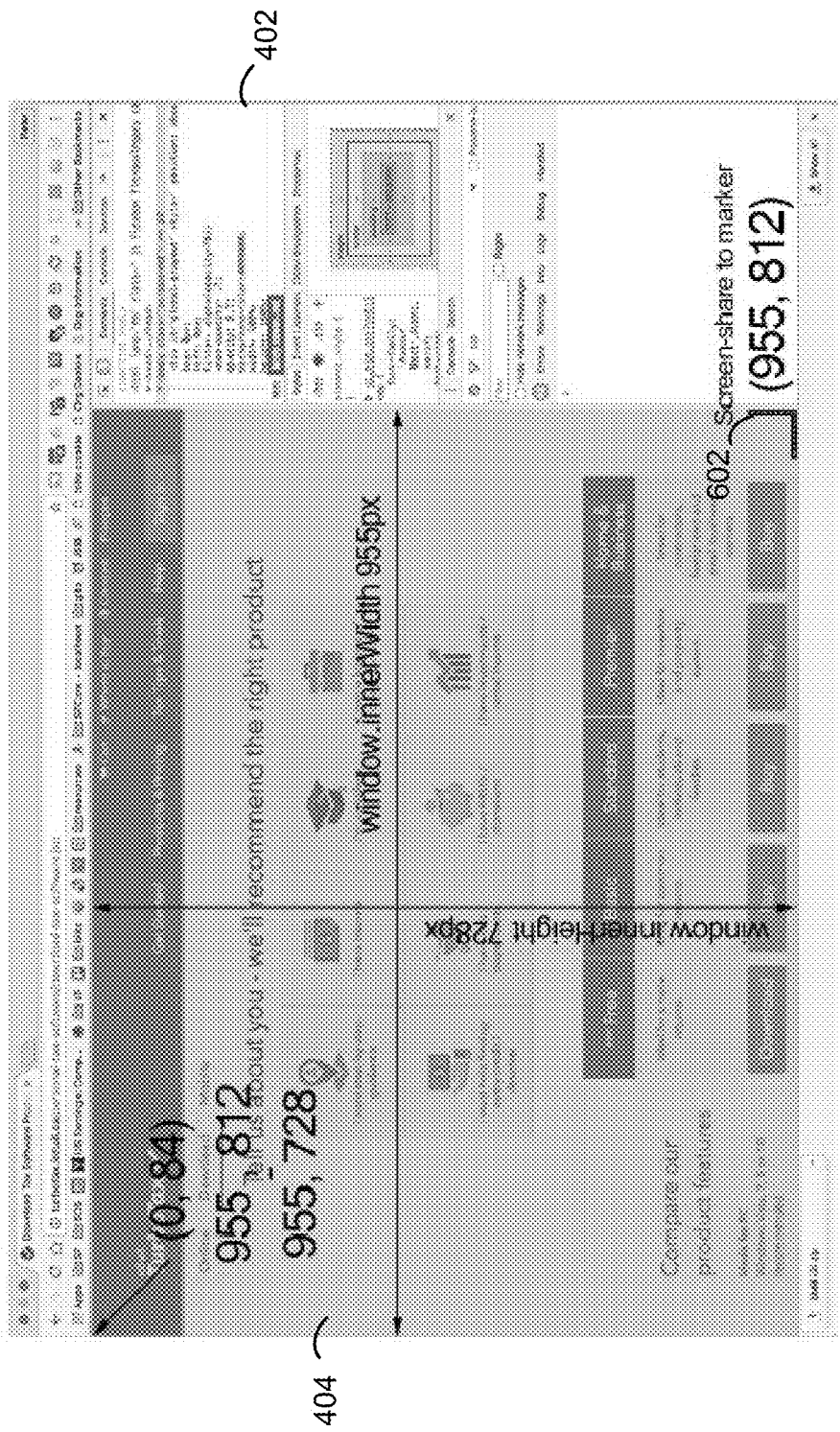
FIG. 6C shows an example of a solution for locating the viewport using a marker, in accordance with some implementations.

FIG. 6C shows an example of a solution for locating the viewport using a marker, in accordance with some implementations. As described above, marker 602 may be displayed in the bottom right corner of the web page. To locate the viewport, a frame from the screen-share is captured. Pixels within the frame may be analyzed to locate the marker 602. By locating the marker 602, the bottom right viewport limits are identified. More particularly, a first portion of marker 602 may abut a bottom edge of the viewport and a second portion of the marker 602 may abut a right edge of the view port. To identify the top left corner of the viewport, window.innerWidth and window.innerHeight are used. The coordinates indicating the dimensions of the viewport may be transmitted to the agent device, enabling the viewport to be rendered at the agent device while cropping out portions of the customer screen-share that are outside the bounds of the viewport. The process may be repeated to again locate the viewport each time the size of the viewport changes.

Figure 6D:
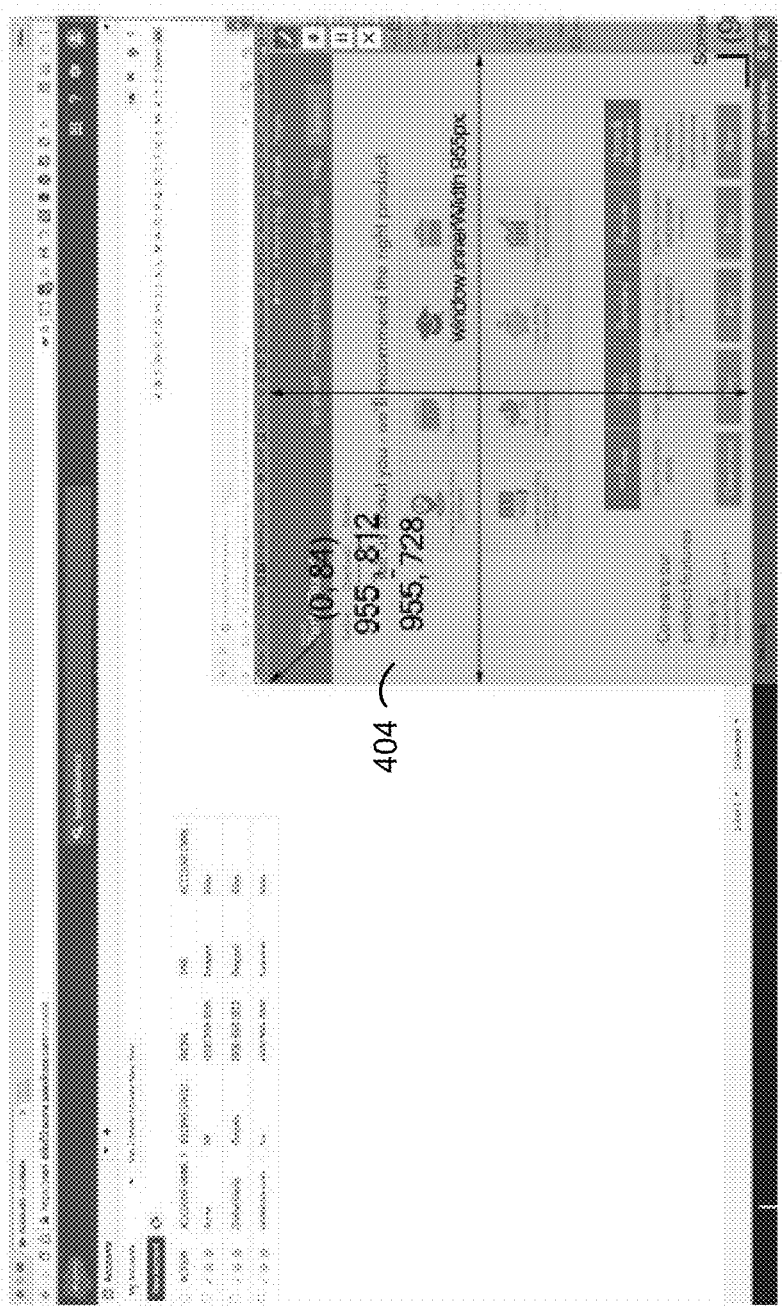
FIG. 6D shows an example of a cropped viewport, in accordance with some implementations.

FIG. 6D shows an example of a cropped viewport, in accordance with some implementations. As shown in this example, after the agent computing device receives the coordinates of the viewport, the agent computing device may crop viewport 404 out from the screen-share to exclude everything outside the viewport 404.

Figure 6E:
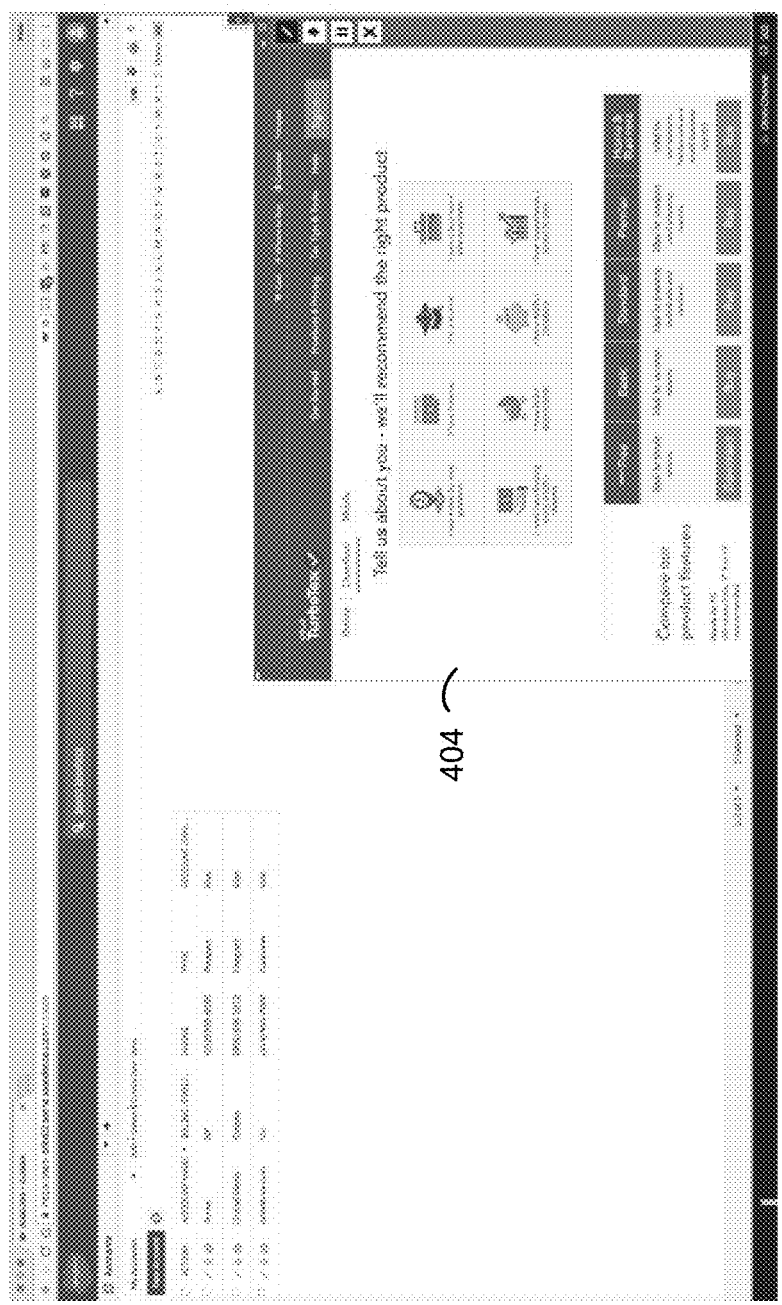
FIG. 6E shows an example of a screen-share that is displayed, in accordance with some implementations.

FIG. 6E shows an example of a screen-share that is displayed, in accordance with some implementations. By cropping the viewport from the screen-share and excluding everything outside the viewport, Tab capture is simulated by only displaying the customer's viewport at the agent computing device.

Figure 7A:
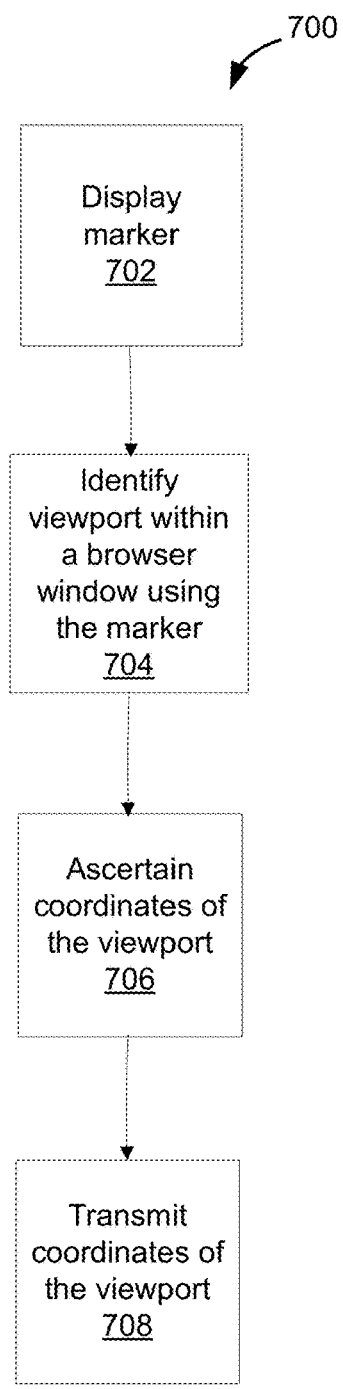
FIG. 7A shows an example of a general method 700 for identifying a viewport within a browser window in accordance with some implementations.

FIG. 7A shows an example of a method 700 for identifying a viewport in accordance with some implementations. At a first computing device (e.g., customer device), a marker is displayed at 702. More particularly, the marker may be displayed in a bottom right corner of a web page rendered at the first computing device within a browser window. A viewport within the browser window is identified using the marker at 704. More particularly, a location of the viewport within the browser window may be identified by identifying a corner of the viewport using the marker. Coordinates of the viewport are ascertained at 706. For example, the coordinates of the viewport may be ascertained based, at least in part, on the location of the viewport, a width of the viewport, and a height of the viewport. Information indicating the coordinates of the viewport may then be transmitted to a second computing device (e.g., agent computing device) at 708.

Figure 7B:
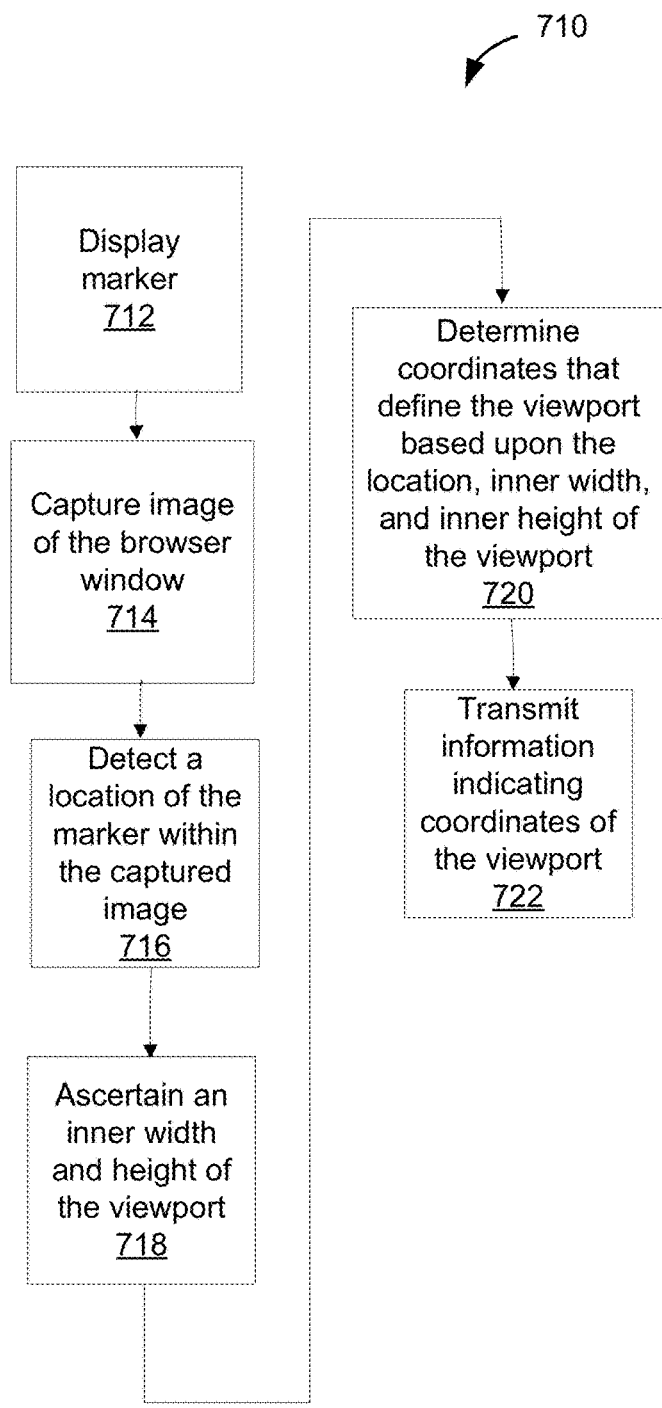
FIG. 7B shows an example of a specific method 710 for identifying a viewport within a browser window, in accordance with some implementations.

FIG. 7B shows an example of a specific method 710 for identifying a viewport within a browser window, in accordance with some implementations. A first marker is displayed via a display of a first computing device at 712 in a bottom right corner of a browser window. The first marker may abut both a bottom edge of a viewport within the browser window and a right edge of the viewport, where the viewport defines an area of a web page within the browser window. The first marker may include a pattern image. In some implementations, the pattern image includes a pattern composed of an alternating sequence of two or more colors.

After the marker is displayed, an image of the browser window may be captured at 714. More particularly, a freeze frame of the customer's screen may be obtained. A location of the marker within the captured image may be detected at 716, where the location of the marker indicates a location of a bottom right corner of the viewport. Specifically, the location of the marker may be detected using pattern recognition to detect the pattern image. In addition, an inner width and inner height of the viewport may be ascertained at 718.

In some implementations, to find the pattern image within the frame, the pattern image may be copied into a hidden canvas element. Pixels may be analyzed from bottom to top and from right to left until a matching sequence of color alternations is detected. More particularly, each pixel may be analyzed to identify specific colors in a specific sequence. In one implementation, the pattern image includes a pattern that is wrapped by black. For example, the pattern may include a sequence of dashes, where the sequence of dashes includes green dashes alternating with black dashes. The pattern may be wrapped in black so that video compression does not affect the color and brightness of the green pixels within the pattern. If the color and brightness of the green pixels were affected, the pattern image would be more difficult to detect.

Coordinates that define the viewport within the browser window may be determined at 720 based, at least in part, on the location of the bottom right corner of the viewport, the inner width of the viewport, and the inner height of the viewport. For example, the coordinates for each corner (e.g., upper left, upper right, lower left, lower right) of the viewport may be determined. Information indicating the coordinates that define the viewport within the browser window may be transmitted to a second computing device at 722.

The second computing device receives the information indicating the coordinates of the viewport from the first computing device and uses the coordinates to display only the viewport portion of the screen-share. Therefore, when a user draws over the screen-share, the drawing is aligned with the viewport.

The process shown and described with reference to FIG. 7B may be repeated each time there are changes to the viewport dimensions. A number of operations can change the viewport dimensions. These operations include, for example, a window resize, zooming in and out of the web page, and toggling developer tools, downloads bar, and any other extensions which would occupy space within the browser window.

Using the zoom feature typically impacts the size of the viewport. More particularly, zooming in may increase the size of the viewport, while zooming out may decrease the size of the viewport. For example, zooming in may increase the window.innerHeight and/or window.innerWidth, while zooming out may decrease the window.innerHeight and/or window.innerWidth. The size of the screen-share does not change dimensions, but items within the screen-share may appear larger or smaller as a result of zooming in or out of the viewport.

To determine the location and coordinates of the viewport after a user zooms in or out, the top left corner of the viewport may be identified. More particularly, a zoom ratio indicated by a zoom feature of the first computing device may be ascertained. A location of the top left corner of the viewport within the browser window may be identified based, at least in part, on the location of the bottom right corner of the viewport, the zoom ratio, the inner width of the viewport and the inner height of the viewport. For example, the x coordinate of the top left corner of the viewport may be calculated by subtracting (innerWidth*zoomRatio) from the x coordinate of the bottom right corner. Similarly, the y coordinate of the top left corner may be calculated by subtracting (innerHeight*zoomRatio) from the y coordinate of the bottom right corner.

Information indicating the location of the viewport within the screen-share may be transmitted to the second computing device. For example, the information may include the coordinates of the lower right corner of the viewport and top left corner of the viewport.

The x and y coordinates of the bottom right corner of the viewport may be determined by iterating through rows of pixels of the captured image. In some implementations, the pixels of the pattern image may be multiplied by the zoom ratio to ensure that the x and y coordinates accurately reflect the bottom right corner of the viewport.

After receiving information pertaining to a drawing performed at the second computing device in relation to the viewport, at least one aspect of the drawing may be modified based, at least in part, on the zoom ratio. After modifying at least one aspect of the drawing, the drawing is rendered at the first computing device.

In accordance with various implementations, when the drawing performed at the second computing device is re-created at the first computing device (e.g., customer computing device), the width of the lines/curves of the drawing may be multiplied by the zoom ratio. In addition, the location of the curves of the drawing may be multiplied the zoom ratio. By applying the zoom ratio to a drawing performed at the second computing device, the drawing may be rendered in the correct location in relation to the viewport.

In some implementations, the width of the lines/curves of the drawing may be reduced by an additional 25 percent. Since image compression blurs lines, a visible halo would appear at the second computing device as a result of the screen-share of the first computing device that includes the drawing. Reducing the width of the curves of the drawing eliminates this effect.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Figure 8A:
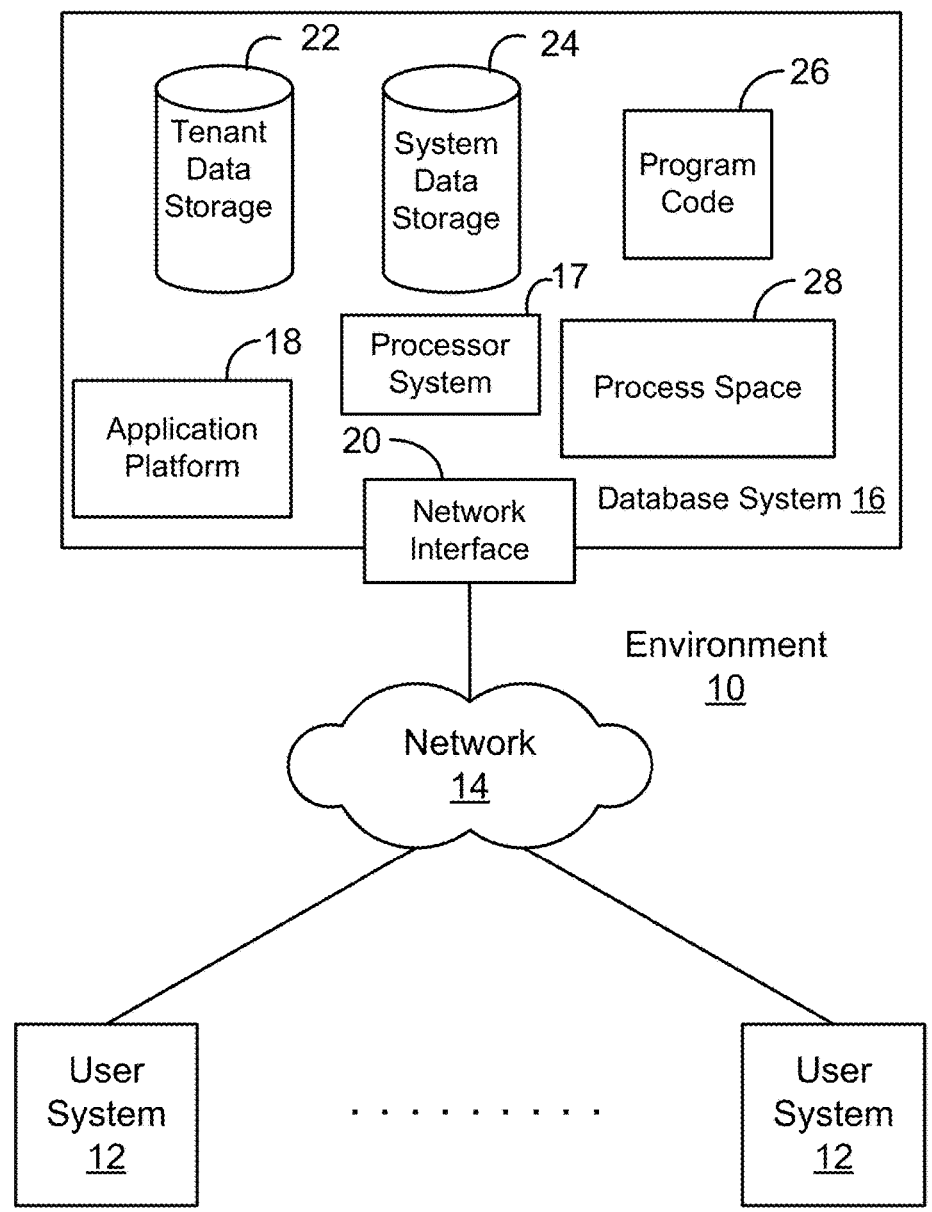
FIG. 8A shows a block diagram of an example of an environment 10 in which an on-demand database service can be used in accordance with some implementations.

Some non-limiting examples of systems, apparatus, and methods are described below for implementing database systems and enterprise level networking systems in conjunction with the disclosed techniques. FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a personal computer, work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
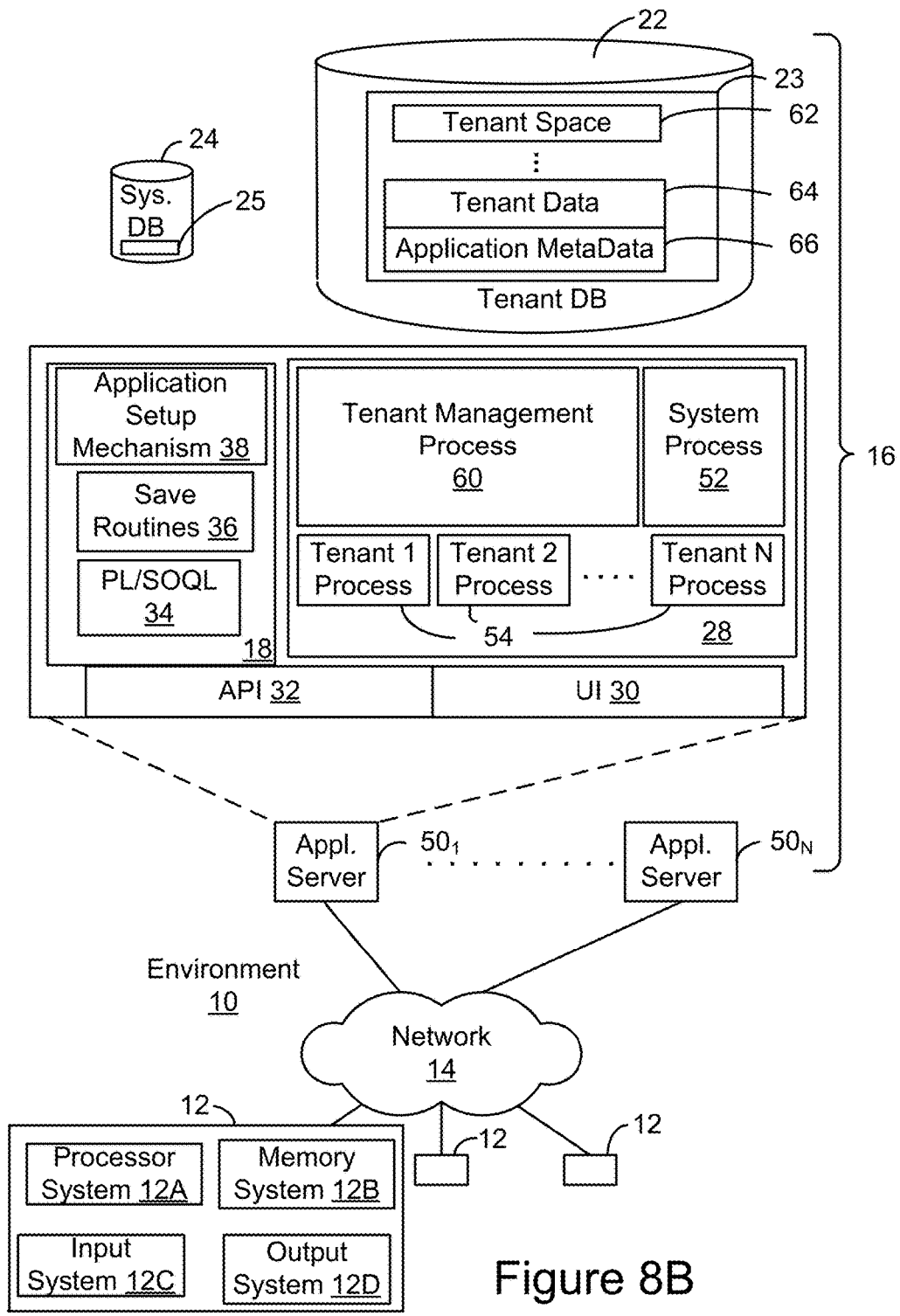
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
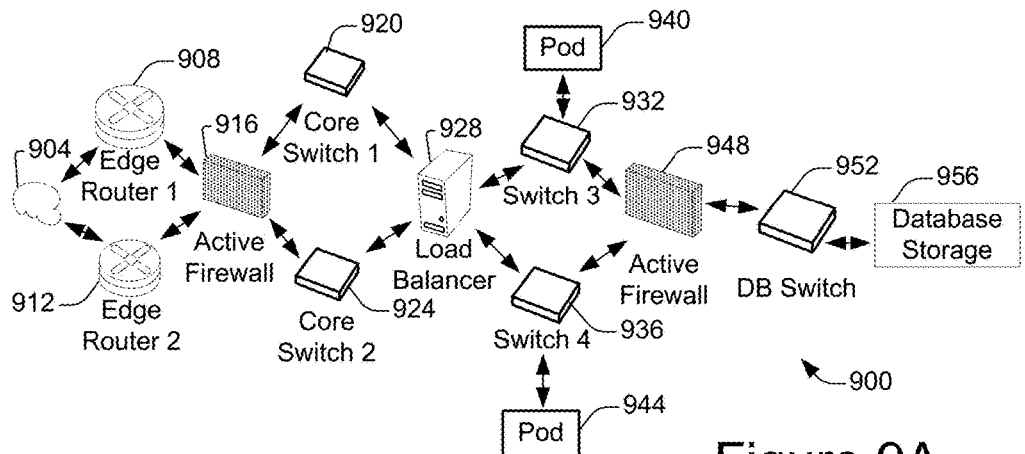
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
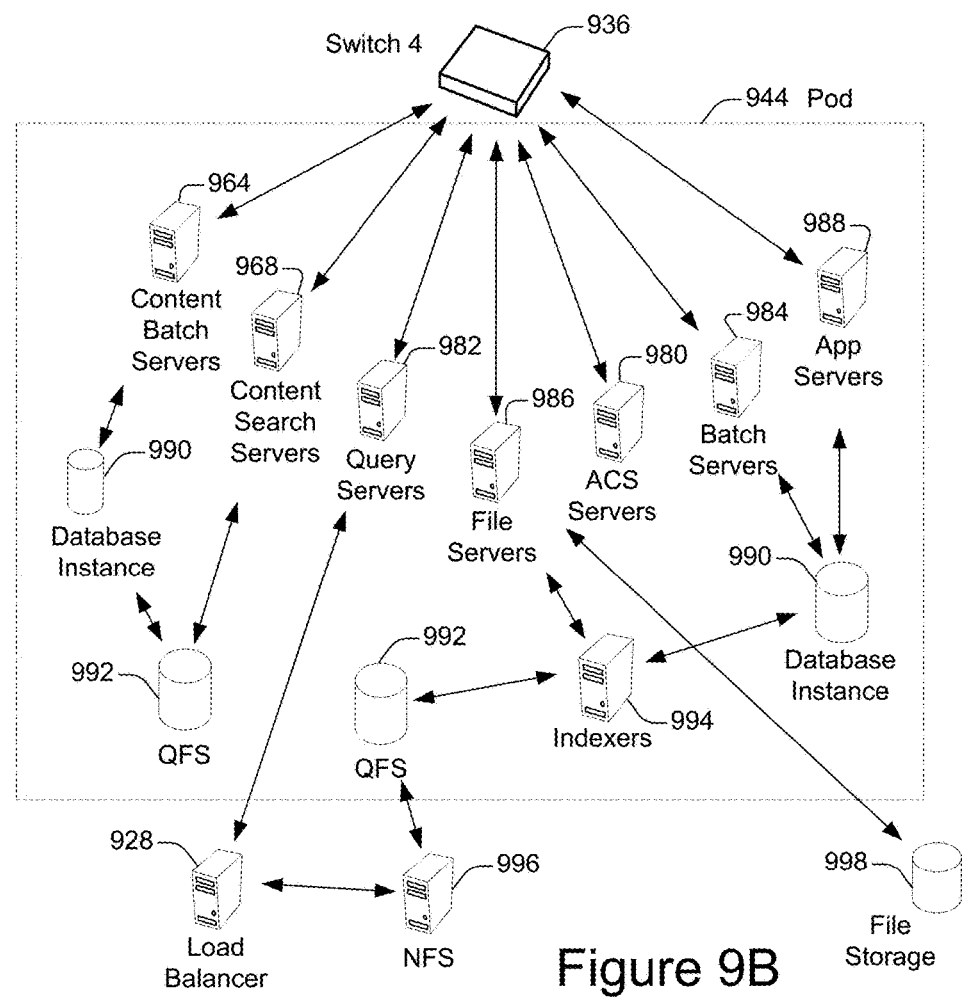
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program product comprising computer-readable program code capable of being executed by one or more processors when retrieved from a non-transitory computer-readable medium, the program code comprising instructions configurable to cause:

displaying, in a display of a first computing device, a pattern image in a bottom right corner of a browser window, a first portion of the pattern image abutting a bottom edge of a viewport within the browser window and a second portion of the pattern image abutting a right edge of the view port, the viewport defining an area of a web page within the browser window, the pattern image including a pattern composed of two or more colors;

after displaying the pattern image, capturing an image of the browser window;

detecting, within the captured image, a location of the pattern image, the location of the pattern image indicating a location of a bottom right corner of the viewport;

ascertaining an inner width of the viewport;

ascertaining an inner height of the viewport;

determining coordinates that define the viewport within the browser window based, at least in part, on the location of the bottom right corner of the viewport, the inner width of the viewport, and the inner height of the viewport; and transmitting information indicating the coordinates that define the viewport within the browser window to a second computing device.

2. The computer program product of claim 1, the program code further comprising instructions configurable to cause:

ascertaining a zoom ratio indicated by a zoom feature of the first computing device; and identifying a location of the top left corner of the viewport within the browser window based, at least in part, on the location of the bottom right corner of the viewport, the zoom ratio, the inner width of the viewport, and the inner height of the viewport;

wherein the information further indicates the location of the top left corner of the viewport.

3. The computer program product of claim 1, the program code further comprising instructions configurable to cause:

receiving information pertaining to a drawing performed at the second computing device in relation to the viewport;

ascertaining a zoom ratio indicated by a zoom feature of the first computing device;

modifying at least one aspect of the drawing based, at least in part, on the zoom ratio; and after modifying at least one aspect of the drawing, rendering the drawing at the first computing device.

4. The computer program product of claim 3, wherein the at least one aspect comprises at least one of: a location of the drawing or a width of at least one line of the drawing.

5. The computer program product of claim 3, wherein modifying the at least one aspect of the drawing comprises reducing the width of at least one line of the drawing.

6. The computer program product of claim 1, the program code further comprising instructions configurable to cause:

ascertaining a zoom ratio indicated by a zoom feature of the first computing device; and multiplying pixels of the pattern image by the zoom ratio.

7. The computer program product of claim 1, wherein displaying the pattern image, capturing an image of the browser window, detecting a location of the pattern image, ascertaining an inner width of the viewport, ascertaining an inner height of the viewport, determining the coordinates that define the viewport, and transmitting the information are performed after a resize event.

8. The computer program product of claim 7, wherein the resize event comprises a zoom operation.

9. The computer program product of claim 7, wherein the resize event comprises a resize of the browser window.

10. The computer program product of claim 1, wherein the pattern image comprises black pixels that surround the pattern.

11. The computer program product of claim 1, wherein the pattern comprises a sequence in which the two or more colors are alternated.

12. The computer program product of claim 1, wherein the pattern comprises an alternating sequence of dashes of the two or more colors.

13. The computer program product of claim 1, wherein the two or more colors comprise black.

14. The computer program product of claim 1, wherein the first computing device comprises a mobile device.

15. The computer program product of claim 1, the viewport defining an area of the browser window being shared with the second computing device.

16. An apparatus, comprising:

a processor; and a memory, the memory including instructions configurable to cause:

displaying, in a display of a first computing device, a pattern image in a bottom right corner of a browser window, a first portion of the pattern image abutting a bottom edge of a viewport within the browser window and a second portion of the pattern image abutting a right edge of the view port, the viewport defining an area of a web page within the browser window, the pattern image including a pattern composed of two or more colors;

after displaying the pattern image, capturing an image of the browser window;

detecting, within the captured image, a location of the pattern image, the location of the pattern image indicating a location of a bottom right corner of the viewport;

ascertaining an inner width of the viewport;

ascertaining an inner height of the viewport;

determining coordinates that define the viewport within the browser window based, at least in part, on the location of the bottom right corner of the viewport, the inner width of the viewport, and the inner height of the viewport; and transmitting information indicating the coordinates that define the viewport within the browser window to a second computing device.

17. The apparatus of claim 16, wherein the pattern includes a sequence in which the two or more colors are alternated.

18. The apparatus of claim 16, wherein the first computing device comprises a mobile device.

19. A method, comprising:

displaying, in a display of a first computing device, a pattern image in a bottom right corner of a browser window, a first portion of the pattern image abutting a bottom edge of a viewport within the browser window and a second portion of the pattern image abutting a right edge of the view port, the viewport defining an area of a web page within the browser window, the pattern image including a pattern composed of two or more colors;

after displaying the pattern image, capturing an image of the browser window;

detecting, within the captured image, a location of the pattern image, the location of the pattern image indicating a location of a bottom right corner of the viewport;

ascertaining an inner width of the viewport;

ascertaining an inner height of the viewport;

determining coordinates that define the viewport within the browser window based, at least in part, on the location of the bottom right corner of the viewport, the inner width of the viewport, and the inner height of the viewport; and transmitting information indicating the coordinates that define the viewport within the browser window to a second computing device.

20. The computer program product of claim 1, wherein the information comprises the coordinates that define the viewport within the browser window.

\* \* \* \* \*